(12) United States Patent
Dewasurendra et al.

(10) Patent No.: US 8,559,380 B2
(45) Date of Patent: Oct. 15, 2013

(54) METHOD AND APPARATUS FOR ESTABLISHING A CALL IN A DIGITAL RADIO COMMUNICATION SYSTEM

(75) Inventors: Duminda A. Dewasurendra, Plantation, FL (US); Lorenzo Cruger, Jr., Coral Springs, FL (US); Mahes M. Ekanayake, Davie, FL (US); Wayne M. Phang, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 596 days.

(21) Appl. No.: 12/325,640

(22) Filed: Dec. 1, 2008

(65) Prior Publication Data

US 2010/0136988 A1 Jun. 3, 2010

(51) Int. Cl.
*H04W 4/00* (2009.01)
(52) U.S. Cl.
USPC .......................................... 370/329; 455/509
(58) Field of Classification Search
USPC .................. 370/315; 455/450, 509; 398/128
See application file for complete search history.

(56) References Cited

U.S. PATENT DOCUMENTS

| 5,943,326 | A | 8/1999 | Schroderus | |
|---|---|---|---|---|
| 6,226,524 | B1* | 5/2001 | Allen et al. | 455/509 |
| 7,164,930 | B2 | 1/2007 | Korneluk et al. | |
| 2003/0179721 | A1* | 9/2003 | Shurmantine et al. | 370/315 |
| 2006/0252367 | A1 | 11/2006 | Haartsen | |
| 2008/0131134 | A1* | 6/2008 | Dreischer et al. | 398/128 |
| 2008/0247372 | A1 | 10/2008 | Chion et al. | |
| 2010/0136988 | A1* | 6/2010 | Dewasurendra et al. | 455/450 |
| 2010/0214999 | A1 | 8/2010 | Kubo et al. | |

FOREIGN PATENT DOCUMENTS

| EP | 1879421 A1 | 1/2008 |
|---|---|---|
| WO | 2008139830 A1 | 11/2008 |

OTHER PUBLICATIONS

International Search Report and Written Opinion for International Application No. PCT/US2009/057387 mailed on Apr. 23, 2010.
English Language Abstract of JP Patent Publication No. JP2005184520A, European Patent Office, espacenet database—Worldwide (2003).
English Language Abstract of KR Patent Publication No. KR20090102501, European Patent Office, espacenet database—Worldwide (2003).
International Preliminary Report on Patentability for International Application No. PCT/US2009/057387 dated Jun. 7, 2011.
Korean Patent Application No. 10-2011-7012518—Preliminary Amendment Mailed Nov. 9, 2012—English Translation—3 Pages.
Patent Abstracts of Japan—Publication No. 2005-184520, Publication Dated Jul. 7, 2005—Fujitsu Ltd.
European Search Report—Application No. 09830766.3—Mailed Nov. 14, 2012—5 Pages.

\* cited by examiner

*Primary Examiner* — Huy D Vu
*Assistant Examiner* — Joseph Bednash
(74) *Attorney, Agent, or Firm* — Barbara R. Doutre

(57) ABSTRACT

A digital radio communication system (200) uses a repeater (216) to relay calls which can not be completed in a direct talk-around mode between two radios. The repeater (216) establishes early synchronization in advance of a pending call by listening to an originator radio (204) attempt to make a direct talk-around call to a target radio (210). Asynchronous digital two-way radio communication systems can benefit from the reduction in voice call connect time.

23 Claims, 4 Drawing Sheets

-PRIOR ART-

METHOD AND APPARATUS FOR ESTABLISHING A CALL IN A DIGITAL RADIO COMMUNICATION SYSTEM

FIELD OF THE INVENTION

The invention generally relates to communication systems and more particularly to the establishment of calls in asynchronous digital two-way radio communication systems.

BACKGROUND OF THE INVENTION

In asynchronous digital two-way radio systems, the radios are not synchronized to each other or to any infrastructure, in time or frequency. In typical operation, a target radio obtains both time and frequency synchronization information from the originator radio at the beginning of each call. The radios then communicate using frequency hopping in license-free bands, such as the Industrial, Scientific and Medical (ISM) radio bands. In such systems, the radios connect in a direct talk-around mode as long as the originator and the target are within range of each other. No other infrastructure is required to support the operation of the radios in this mode as long as the radios remain within range of each other.

The range of communication in such radio systems can be increased by introducing a repeater. The repeater unit acts only in an on-demand fashion and does not affect the default asynchronous operation of the radio. An originator radio connects to the target radio via the repeater only when the direct talk-around mode is not possible due to range limitations. In such systems, to relay a call that cannot otherwise be completed in the direct talk-around mode, the repeater also has to acquire time and frequency synchronization information from the originator radio. Following receipt of the information, the repeater has to send new time and frequency information to the target.

A typical repeater based communication scenario is shown in FIG. 1. Communication system 100 is shown along a timeline 102 and includes an originator radio 104 which first attempts to connect to a target radio 110 in direct, talk-around mode by sending initial time and frequency synchronization information 106. If the originator 104 receives no response from the target 110, the originator makes a second attempt, but this time, trying to connect to a repeater 116. In addition to sending synchronization information, the originator 104 also sends identification information to the repeater identifying the target with which the originator wants to connect.

Once a link (referred to as an uplink) is established between the originator 104 and the repeater 116, the repeater sends new time and frequency synchronization information 118 to the target 110. Hence, synchronization information is sent twice from the originator 104, once to the target 110 and then to the repeater 116. This procedure significantly extends the call connect time, which is critical in voice communication in two-way radio systems.

Accordingly, it would be desirable to reduce the call connect time in a digital two-way communication system.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
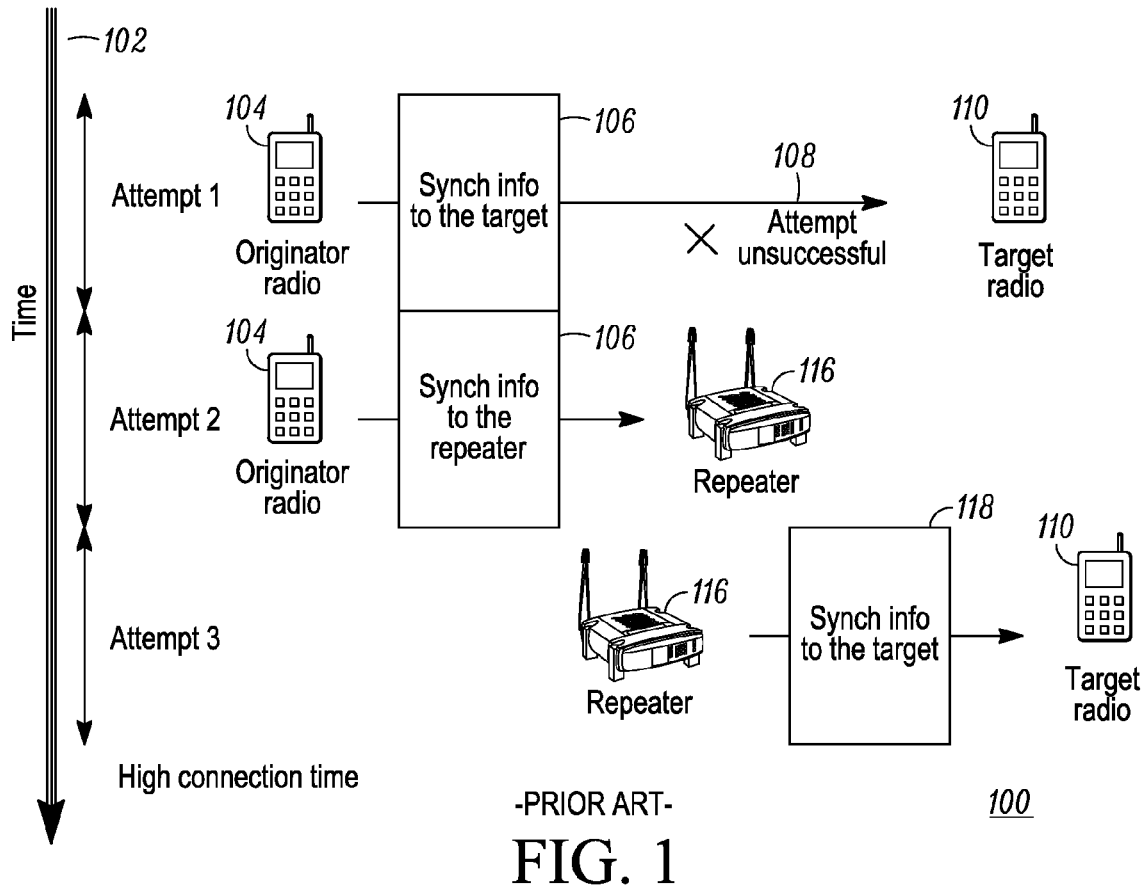
FIG. 1 is a time line diagram for establishing an uplink in accordance with a typical repeater based asynchronous digital communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in apparatus components and methods related to establishing communication in an asynchronous digital two-way radio communication system. The technique and components described herein provide for early synchronization of a repeater thereby reducing call connect time.

Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Briefly, in accordance with various embodiments of the invention, a digital communication system and synchronization technique achieve repeater synchronization using the same information initially sent from an originator radio to a target radio—that is, during an initial attempt at direct talk-around mode between the two radios. In essence, the repeater is synchronized in advance, by listening to (eavesdropping on) the synchronization information of a pending call. If a call succeeds in a direct talk-around mode during the first attempt, the repeater does not attempt to relay the call. If the first attempt is not successful, the repeater is already synchronized to the originator and immediately starts relaying the call to the target thereby reducing connection time.

Figure 2:
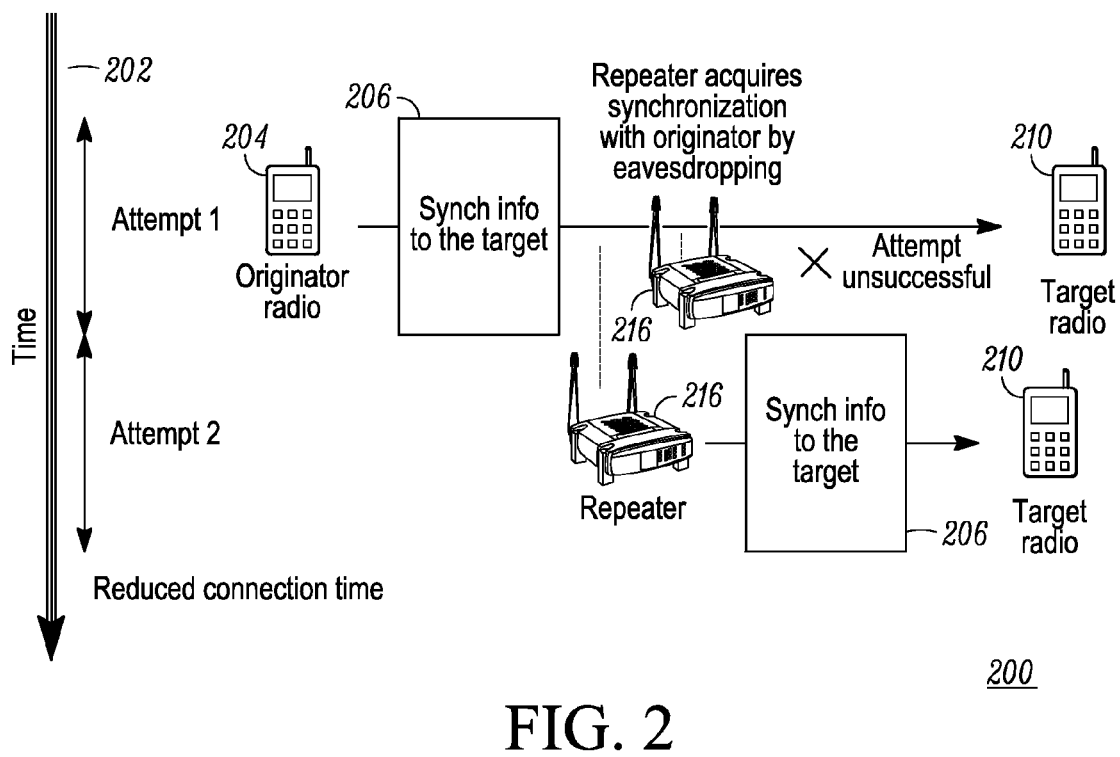
FIG. 2 is a time line diagram for establishing an uplink using a repeater based asynchronous digital communication system operating in accordance with various embodiments of the invention.

FIG. 2 shows a time line 202 for establishing a call in a digital radio communication system 200 operating in accordance with various embodiments of the invention. Originator radio 204 sends synchronization information 206 to a target radio 210 in an attempt to establish a direct talk-around link between the two radios. One or more repeaters 216 acquire the synchronization information 206 by eavesdropping on the link attempt. If the attempt at linking to the target radio 210 in direct talk-around mode is unsuccessful, then a second attempt is made to link to the target radio 210 utilizing the best available repeater.

The synchronization technique, operating in accordance with various embodiments, enables the originator radio 204 to readily use a repeater, if needed, without resending the time and frequency synchronization information targeted separately for the repeater before engaging the repeater in a particular call. A repeater is only used when direct mode is not possible thereby reducing repeater loading. Multiple repeaters can be supported in the same channel, and the synchronization technique operating in accordance with the various embodiments enables the originator radio to know in advance which repeaters are available to service a particular call in a multi-repeater site. Additionally, the originator radio is able to select the optimum repeater for a particular call based on predetermined radiometric parameters, such as receive signal strength indicator (RSSI) parameters or the like. If desired and available, location information (location of the repeaters, location of the radios), may also be used to complement the RSSI.

Figure 3:
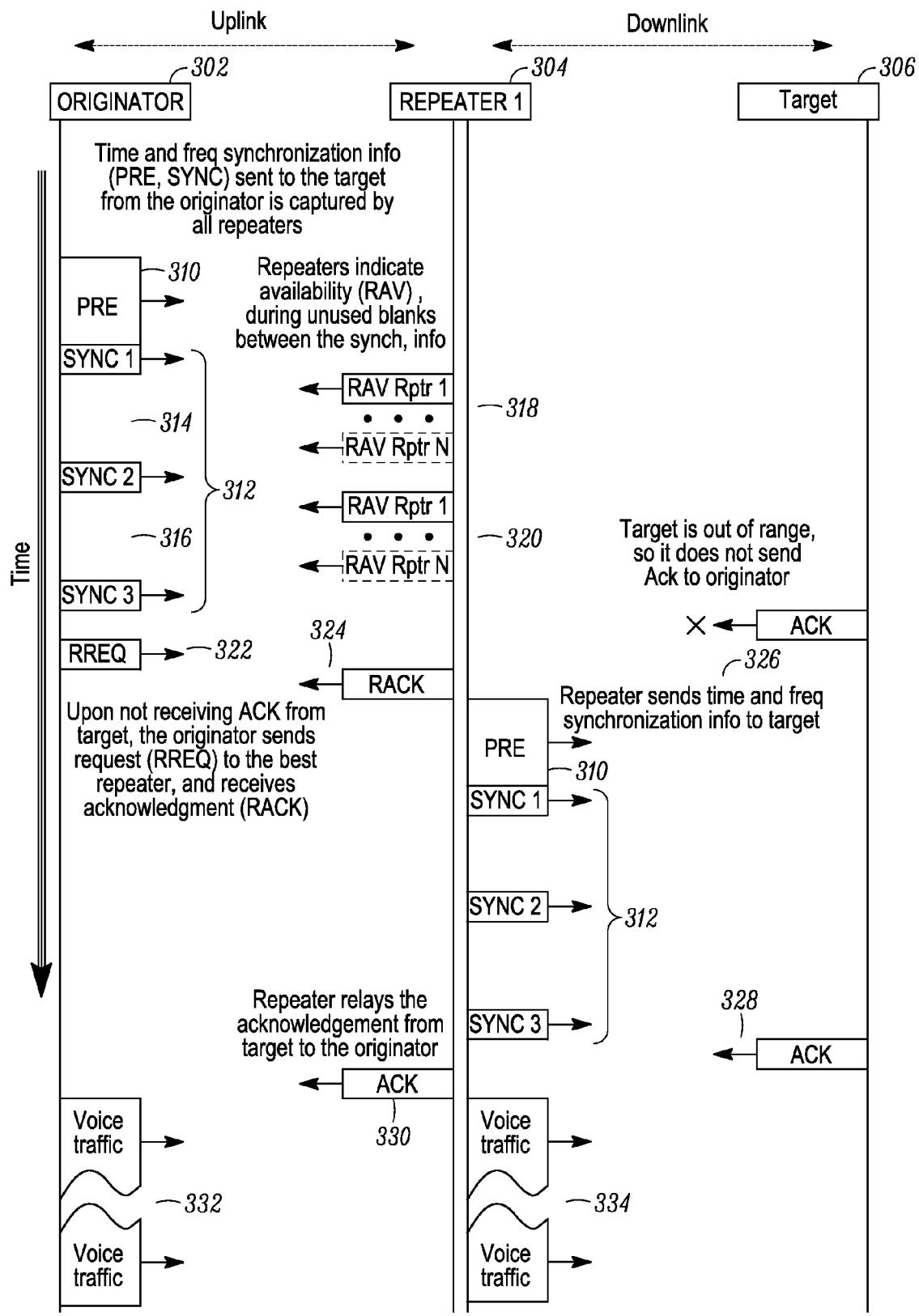
FIG. 3 is a diagram uplink and downlink exchanges in accordance with various embodiments of the invention.

FIG. 3 is a timeline 300 of uplink and downlink information used for establishing a call in an asynchronous digital two-way radio communication system in accordance with various embodiments of the invention. The timeline 300 demonstrates how a repeater listens into a call attempt being made from an originator radio 302 to a target radio 306. Beginning with the originator radio 302, time and frequency synchronization information are sent out and captured by all repeaters 304, in this case only one repeater 304 is shown but the process is the same for multiple repeaters. The time and frequency synchronization information is sent in the form of preamble slot (PRE) 310 and synchronization (SYNC) slots 312. The PRE slot 310 actually represents a plurality of preamble slots which are used to initiate the call in the uplink frequencies. The PRE slot 310 wakes up receivers and provides initial, preliminary time and frequency synchronization information. The SYNC slots 312 provide exact time and frequency hopping synchronization information as well as call content information including target radio identification (ID). Three SYNC slots (SYNC 1, SYNC 2, SYNC 3) are used in this example with predetermined blank time periods in between, for example 90 ms and the three SYNC slots are sent at different frequencies to ensure frequency diversity. It should be noted that these blank times already exist and are necessary for system operation. The method of establishing a call in accordance with the various embodiments advantageously uses the existing blanks, and hence no increase in synchronization timing is incurred.

In response to receiving the PRE slot 310 and the SYNC slots 312, the repeater indicates its availability using repeater availability slots (RAV) 318 during unused blank time periods 314, 318 between the synchronization information. The RAV slots contain RSSI information and may further contain other parameters that help the originator select the optimal repeater, such as location information. Identical RAV slots are sent from a particular repeater during the blank time periods between synchronization slots to ensure frequency diversity for robust reception. The RAV slots initiated by the repeater indicate in advance that the repeater is available for service of the incoming call. Additional information sent inside each RAV slot 318 includes a target parametric value, such as the last target RSSI value, which will later be used in determining an optimum repeater in the case of multiple available repeaters. In this example, no further blank time periods exist after SYNC3 and as such no RAV slot is sent in response to the repeater detecting SYNC3. By not assigning a specific time for the repeater to respond to SYNC3 additional voice connection delays are avoided. One skilled in the art will appreciate that the number of synchronization slots and blank time periods can all be adjusted according to a particular communication system's uplink and downlink requirements.

In this example, the target 306 is considered to be out of range and thus no acknowledgement (ACK) is sent from the target. Upon failure to receive an ACK from the target, the originator 302 sends a repeater request (RREQ) 322 to the optimum repeater (selection of which will be described later but for the purposes of this example is assumed to be repeater 304). The RREQ contains the ID of the requested repeater. The RREQ slots are only sent when no acknowledgement (ACK) is received from the target 306. Upon receipt of the RREQ 322, the repeater 304 sends a repeater acknowledgment (RACK) 324 back to the originator 302. Once the repeater 304 has sent its RACK 324 back to the originator 302, the repeater 304 sends the same time and frequency synchronization information (PRE, SYNC, 1, 2, 3) to the target at 326. In response to the target being within range of the repeater 304, an acknowledgment (ACK) is sent out by the target at 328. The repeater 304 relays the acknowledgment (ACK) to the originator 302 at 330 thereby enabling voice traffic 332/334 to be exchanged between the originator 302 and the target 306 via the repeater at 304.

Figure 4:
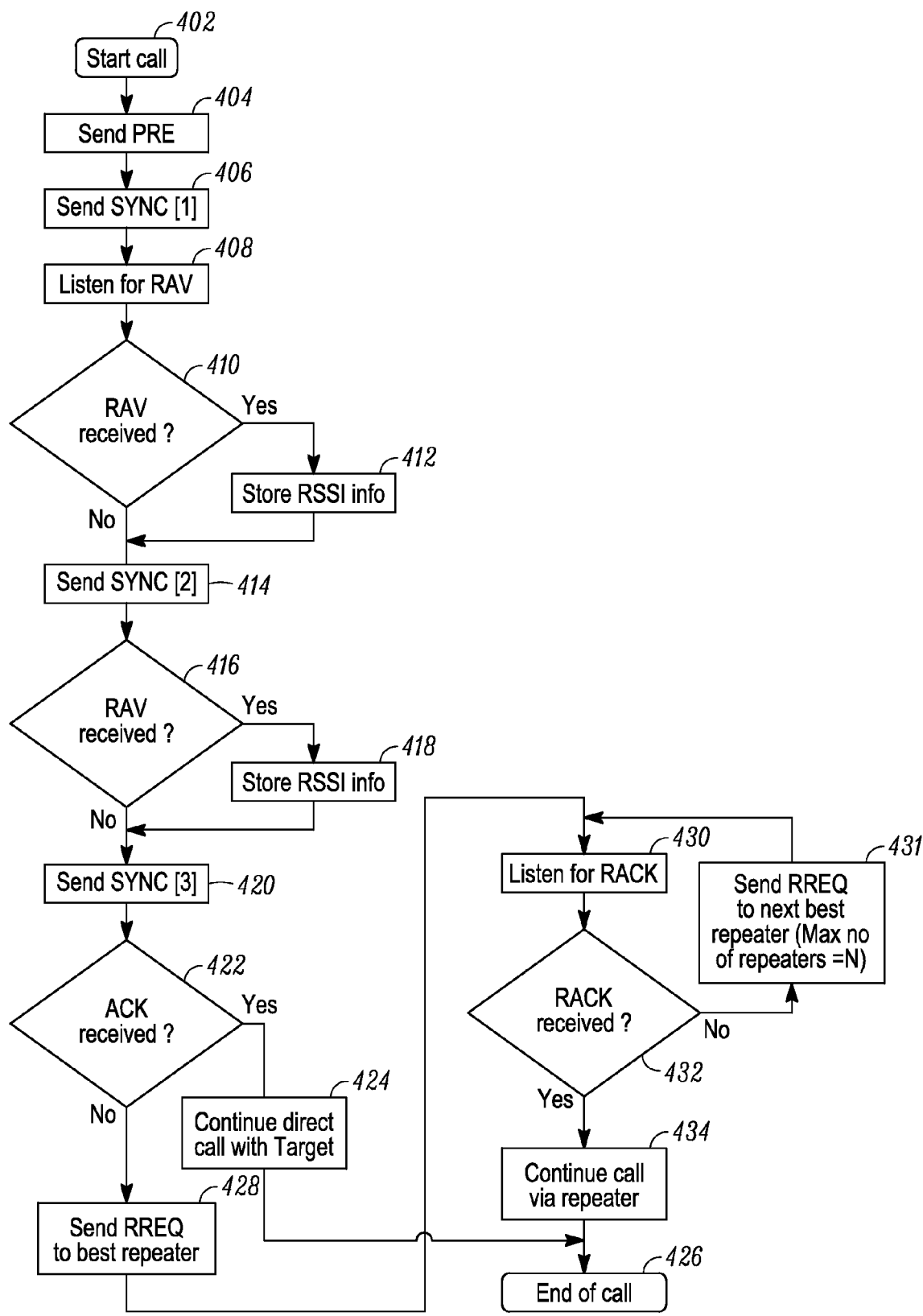
FIG. 4 is method of synchronizing a digital two-way repeater based communication system from the originator perspective in accordance with various embodiments of the invention.

In accordance with the various embodiments of the invention, the selection of an optimum repeater rests with the originator radio. The receipt of a RAV indicator from a particular repeater indicates that it is available and not busy and further provides information pertaining to a target's historical received signal strength (RSSI). By comparing the RSSI of the RAV indicator from multiple repeaters, the originator can determine which repeater is the closest to it (the closer the better). FIG. 4 is a method 400 of selecting an optimum repeater and establishing a call in a digital communication system from the perspective of the originator in accordance with various embodiments of the invention. The originator begins at 402 by sending preamble slots at 404 and sending an initial synchronization slot SYNC1 at 406. The originator then listens for a repeater to indicate its availability (RAV) at 408. When a RAV is received at 410, RSSI information related to the target is stored within the originator at 412.

After the RSSI information is stored at 412 or after no RAV is received at 410, the originator sends out another synchronization slot (SYNC2) at 414. A determination is made at 416 as to whether a RAV slot has been received. When a RAV slot is received at 416, the target RSSI information is stored at 418. If no RAV slot was received at 416 or once the RSSI has been stored at 418 then a third synchronization slot is sent (SYNC3) at 420.

After the synchronization slots have been sent by the originator (in this example three synchronization slots were used), the originator checks whether an acknowledgement (ACK) has been received at 422. If an acknowledgement has been received at 422 then the originator can continue the call in direct talk-around mode with the target (without the use of a repeater) until the call ends at 426.

If no acknowledgment (ACK) is received at 422, then a repeater request RREQ is sent to the best repeater at 428, the selection of which is based on the stored RSSI values. The originator listens then for a repeater acknowledgment (RACK) from the best repeater at 430. If no RACK is received at 432, the originator sends another repeater request (RREQ) at to the next best repeater at 431 and listens again to determine if a RACK is received at 430. Steps 430, 432, 431 are repeated until a RACK is received from amongst the maximum number of repeaters. Once a RACK is received by at 432, the call is continued between the originator and the target via the repeater at 434 until the completion of the call at 436.

Figure 5:
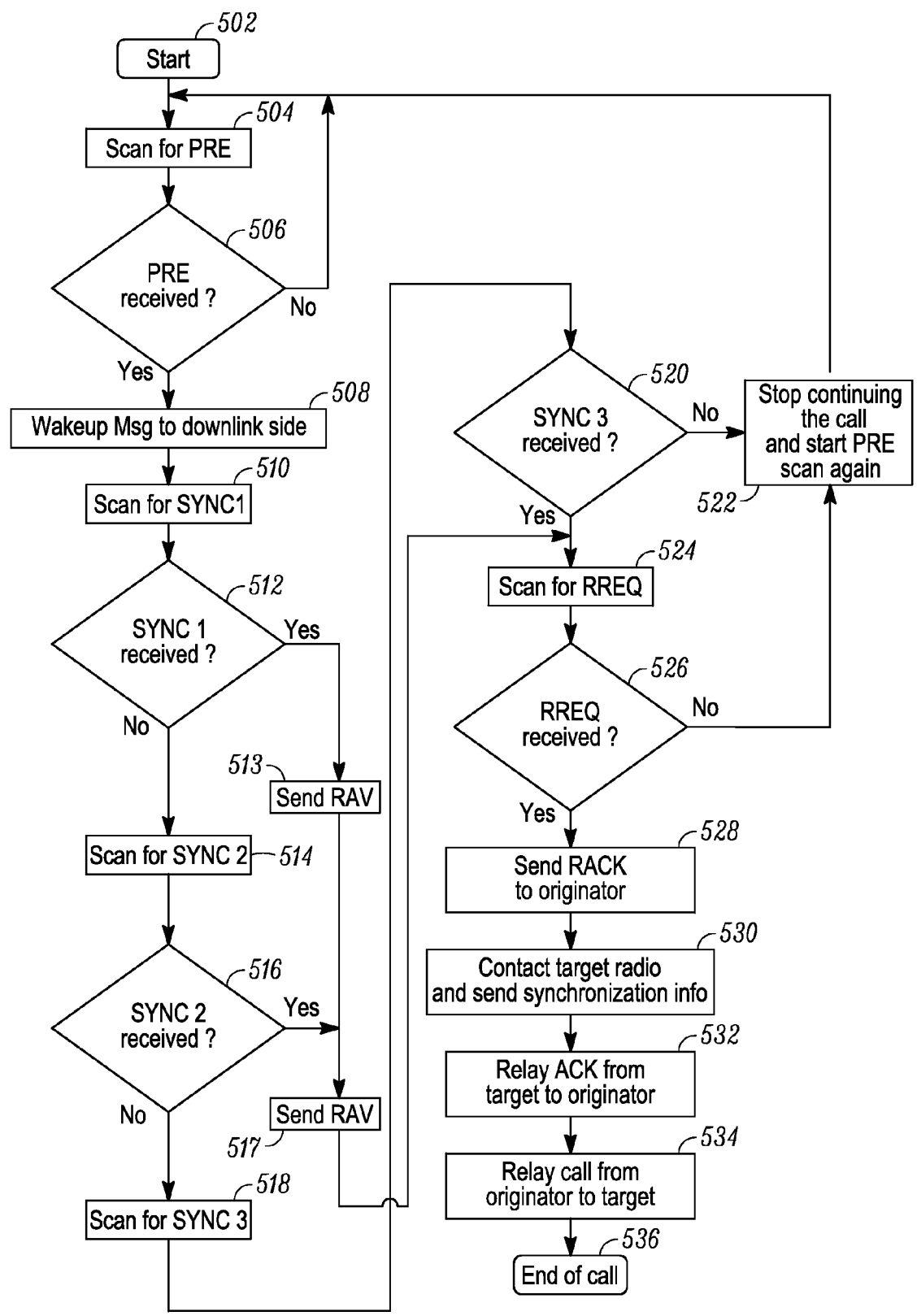
FIG. 5 is a method of synchronizing a digital two-way repeater based communication system from the repeater perspective in accordance with various embodiments of the invention.

FIG. 5 is a method 500 of establishing a call in a digital radio communication system from the perspective of the repeater in accordance with various embodiments of the invention. Beginning at 502, the repeater scans for preamble slots (PRE) at 504 until it determines at 506 that a PRE slot is received which wakes up the repeater and enables downlink operation at 508. The repeater begins scanning for a synchronization slot beginning with a first synchronization slot (SYNC1) at 512. If the repeater detects SYNC1 at 512, it skips any further scanning and sends two repeater available (RAV) indicators at 513 and 517 (repeating the same information twice) to the originator. The repeater then proceeds directly to 524 to scan for repeater requests coming in from the originator.

If no SYNC1 was detected at 512 then the repeater scans for a second synchronization slot (SYNC2) at 514. If SYNC2 is detected at 514, then the repeater sends a single RAV indicator to the originator at 517 and then proceeds directly to scan for repeater requests (RREQ) at 524.

If the second synchronization slot (SYNC 2) is not received at 516, then the repeater scans for a third synchronization slot (SYNC 3) at 518. If SYNC 3 is received at 520, the repeater proceeds directly to scan for a repeater request (RREQ) at 524. If no synchronization slots (SYNC 1, 2, 3) are received as a result of the scans or if no RREQs are received at 526, then the repeater stops scanning for a call over these synchronization slots at 522 and returns to scan for a preamble again at 504.

When a repeater request (RREQ) is received at 526, then the repeater sends an acknowledgment (RACK) at 528. The repeater then contacts the target radio and sends synchronization information at 530. An acknowledgment (ACK) is relayed from the target back to the originator via the repeater and the call is relayed from the originator to the target via the repeater until the call ends at 536.

Accordingly, there has been provided a technique and apparatus for establishing a call in an asynchronous digital two-way radio communication system. The technique in accordance with the various embodiments is applicable to non-frequency hopping systems and frequency hopping systems which typically have high connection delays. Radios that communicate using frequency hopping in license-free bands, such as the Industrial, Scientific and Medical (ISM) radio band, can benefit from the improved call acquisition timing. Those skilled in the art will appreciate that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. An asynchronous digital two-way radio communication system comprising:
   an originator radio attempting to establish a call in a direct talk-around mode with a target radio by sending synchronization information to the target radio;
   a repeater acquiring the same synchronization information sent by the originator radio to the target radio by listening to the synchronization information to synchronize in advance with the originator radio during the direct talk-around mode attempt, without the originator radio resending the synchronization information, wherein the repeater further relays the call by sending the synchronization information acquired during the direct talk-around mode to the target radio only when the call cannot be completed in the direct talk-around mode thereby reducing call connect time and reducing repeater loading.

2. The communication system of claim 1, further comprising a plurality of repeaters listening to the synchronization information and acquiring the synchronization information, the plurality of repeaters synchronizing with the originator radio and one of the plurality of repeaters being selected by the originator radio to relay the call to the target radio when the attempt at the direct talk-around mode is unsuccessful.

3. The communication system of claim 2, wherein the plurality of repeaters are in direct range of the originator radio and are not engaged in a call, each repeater synchronizing with the originator radio using the synchronization information, the originator radio selecting the repeater from the plurality of repeaters for communication based on a receive signal strength indicator (RSSI).

4. The communication system of claim 3, wherein the RSSI is based on repeater RSSI over an uplink for each repeater, and target RSSI for each repeater over a downlink.

5. The communication system of claim 2, wherein the call is established using frequency hopping channels.

6. The communication system of claim 1, wherein the originator radio does not attempt to relay the call from the repeater when the direct talk-around mode between the originator radio and the target radio is successful.

7. The communication system of claim 1, wherein the originator radio sends the synchronization information to the target radio by sending preamble slots and a plurality of synchronization slots.

8. The communication system of claim 7, wherein the target radio is synchronized using the preamble slots and the plurality of synchronization slots when the target radio is within a direct range of the originator radio.

9. The communication system of claim 7, wherein the repeater is synchronized with the originator radio using the preamble slots and the plurality of synchronization slots during the direct-talk around mode.

10. The communication system of claim 7, wherein the preamble slots comprise a preliminary time and frequency synchronization information.

11. The communication system of claim 7, wherein the plurality of synchronization slots comprises an exact time and frequency synchronization information at known frequencies.

12. The communication system of claim 7, wherein the plurality of synchronization slots are sent at different frequencies to ensure frequency diversity.

13. The communication system of claim 1, wherein the repeater transmits a repeater availability indicator back to the originator radio when the repeater is within a range of the originator radio and is not engaged in another call.

14. The communication system of claim 1, wherein the repeater listens for a repeater request from the originator radio to relay the call to the target radio when the call cannot be completed in the direct talk-around mode.

15. The communication system of claim 14, wherein the repeater scans for other calls when the repeater does not receive the repeater request from the originator radio.

16. The communication system of claim 1, wherein the originator radio and the target radio communicate using frequency hopping in license-free bands.

17. The communication system of claim 1, wherein the repeater is free for at least one other originator radio attempting to establish a call when the originator radio establishes a call with the target radio in the direct talk-around mode.

18. A method of establishing a call in a communication system, comprising:
attempting, by an originator radio, to establish a call in a direct talk-around mode with a target radio by sending synchronization information to the target radio; and
acquiring, by a repeater, the same synchronization information sent by the originator radio to the target radio by listening to the synchronization information to synchronize in advance with the originator radio during the direct talk-around mode attempt, without the originator radio resending the synchronization information, and further relaying the call by sending the synchronization information acquired during the direct talk-around mode to the target radio only when the call cannot be completed in the direct talk-around mode thereby reducing call connect time and reducing repeater loading, the communication system being an asynchronous digital two-way radio communication system.

19. The method of claim 18, further comprising:
at the originator radio:
transmitting original time and frequency synchronization information to the target radio;
receiving repeater availability information from a plurality of repeaters during unused blank time periods occurring between transmissions of the original time and frequency synchronization information;
listening for acknowledgement from the target radio;
upon receiving acknowledgment from the target radio, continuing the call in direct talk-around mode; and
upon not receiving acknowledgment from the target radio, requesting a repeater from the plurality of repeaters to relay the call.

20. The method of claim 19, further comprising:
at each repeater of the plurality of repeaters:
listening for transmission of time and frequency synchronization information from the originator radio to the target radio;
synchronizing itself to the call using the target synchronization information;
indicating the availability of each repeater to the originator radio within an initial synchronization time;
listening for a repeater request from the originator radio to relay the call;
upon receiving the repeater request from the originator radio, sending time and frequency synchronization information to the target radio over a downlink and establishing communication with the target radio to relay the call; and
upon not receiving a repeater request from the originator radio, scanning for other calls.

21. The method of claim 20 further comprising:
collecting signal strength information of each repeater and the target radio; and
selecting the best repeater among the plurality of repeaters operating in a same channel based on signal strength information.

22. The method of claim 20 further comprising establishing communication using frequency hopping channels.

23. The method of claim 18, wherein the repeater is free for at least one other originator radio attempting to establish a call when the originator radio establishes a call with the target radio in the direct talk-around mode.

* * * * *